United States Patent [19]

Harrer et al.

[11] Patent Number: 5,419,433
[45] Date of Patent: May 30, 1995

[54] COMPACT DISC PACKAGE WITH BI-FOLD PANELS

[75] Inventors: Jill L. Harrer; David E. Bade, both of Oakdale; Gregory W. Newman, Inver Grove Heights; Richard A. Stehura, Woodbury; Mark A. Arps, Woodbury, all of Minn.

[73] Assignee: Minnesota Mining and Manufacturing Company, St. Paul, Minn.

[21] Appl. No.: 201,575

[22] Filed: Feb. 25, 1994

[51] Int. Cl.⁶ .............................. B65D 85/57
[52] U.S. Cl. ........................ 206/313; 206/312
[58] Field of Search ............ 206/303, 307–313, 206/387, 444; 229/68 R

[56] References Cited

U.S. PATENT DOCUMENTS

| | | |
|---|---|---|
| 911,794 | 2/1909 | Williams. |
| 1,292,264 | 1/1919 | Coulson et al. |
| 1,463,413 | 7/1923 | Wilburger. |
| 2,333,798 | 11/1943 | Kner .............................. 229/68 |
| 2,512,577 | 6/1950 | Franck ........................... 229/68 |
| 2,636,312 | 4/1953 | Martin ............................ 46/11 |
| 3,116,005 | 12/1963 | Skaggs ........................... 229/40 |
| 3,303,603 | 7/1963 | Abeson .......................... 46/11 |
| 3,361,322 | 1/1968 | Gabriel et al. ................ 229/14 |
| 3,556,391 | 1/1971 | Kosterka ....................... 229/68 |
| 3,717,297 | 2/1973 | Perry ............................. 229/52 |
| 3,870,223 | 3/1975 | Wyant ............................ 229/72 |
| 4,325,507 | 4/1982 | Janhonen ...................... 229/55 |
| 4,473,153 | 9/1984 | Colangelo ..................... 206/312 |
| 4,620,630 | 11/1986 | Moss ............................. 206/45.24 |
| 4,640,413 | 2/1987 | Kaplan et al. ................ 206/232 |
| 4,653,639 | 3/1987 | Traynor ........................ 206/444 |
| 4,694,954 | 9/1987 | Moss ............................ 206/45.26 |
| 4,709,812 | 12/1987 | Kosterka ...................... 206/310 |
| 4,905,831 | 3/1990 | Bagdis et al. ................. 206/444 |
| 5,088,599 | 2/1992 | Mahler ......................... 206/313 |
| 5,101,973 | 4/1992 | Martinez ...................... 206/312 |
| 5,119,933 | 6/1992 | Taylor .......................... 206/232 |
| 5,205,405 | 4/1993 | O'Brien et al. ............... 206/310 |
| 5,219,417 | 6/1993 | O'Brien et al. ............... 206/312 |
| 5,248,032 | 9/1993 | Sheu et al. ................... 206/312 |
| 5,289,918 | 3/1994 | Dobias et al. ................ 206/312 |

FOREIGN PATENT DOCUMENTS

1316922 6/1987 U.S.S.R. ................ 206/444

*Primary Examiner*—Jimmy G. Foster
*Attorney, Agent, or Firm*—Gary L. Griswold; Walter N. Kirn; David B. Kagan

[57] ABSTRACT

A compact disc package made of paper board and including a base panel assembly and a cover panel assembly that are joined by an edge panel and will fold to overlie each other and to open by hinging at the edge panel. The base panel assembly is formed with an outer base panel and two inner base panel sections that fold inwardly from opposite edges of the outer base panel and form pockets for receiving an insert for a compact disc. The insert is flexible such that its corner portions can be inserted through the slots into the pockets formed panel. The insert includes retainers for holding a compact disc in position on the base panel assembly while the cover panel assembly is hinged over the insert and a compact disc on the insert.

9 Claims, 4 Drawing Sheets

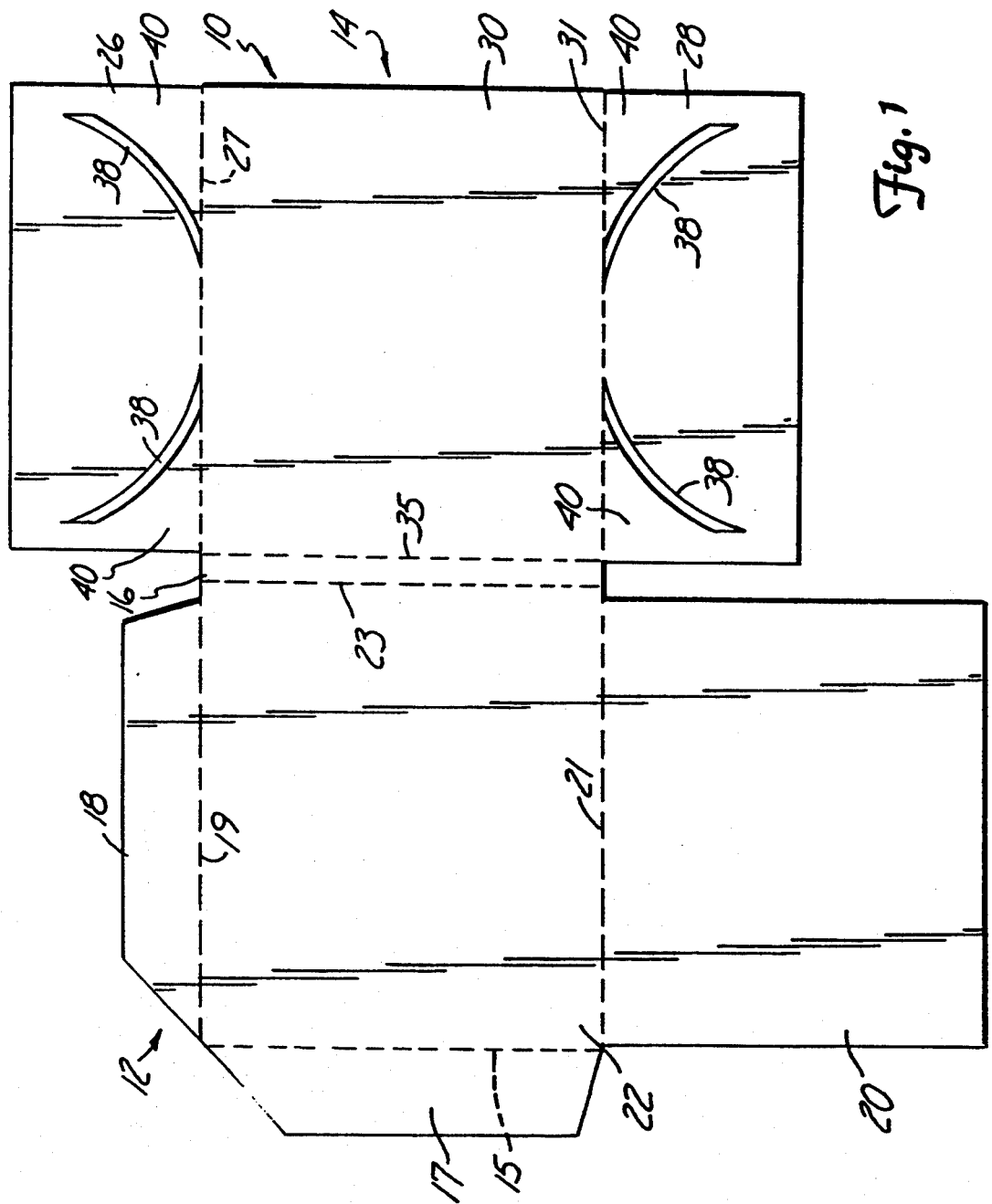

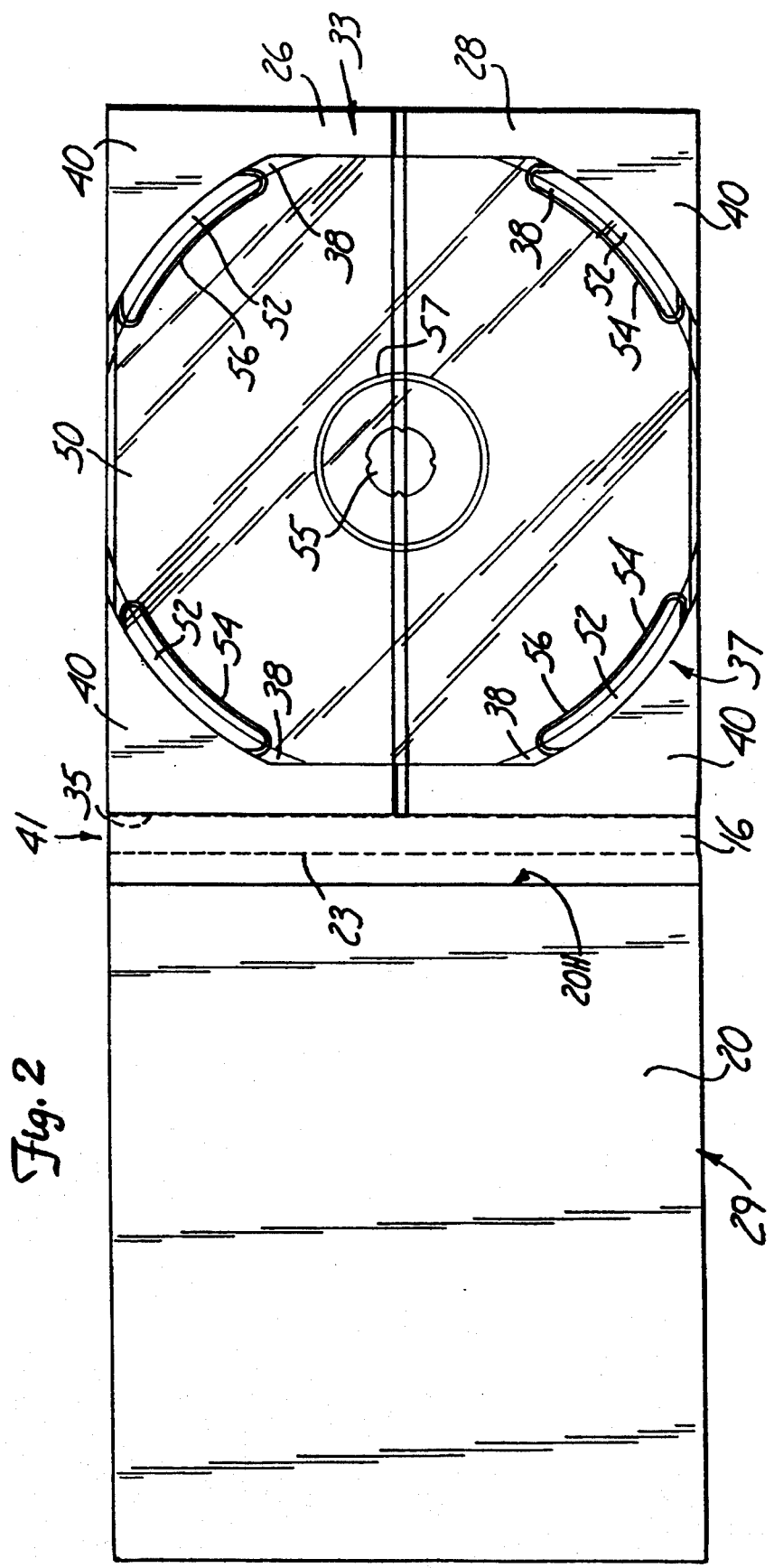

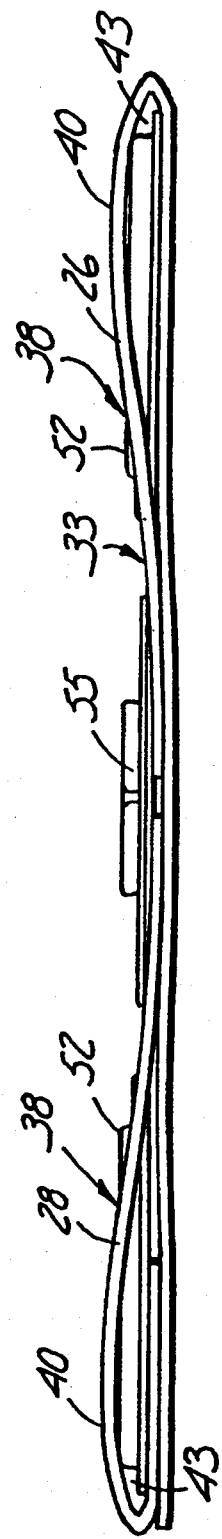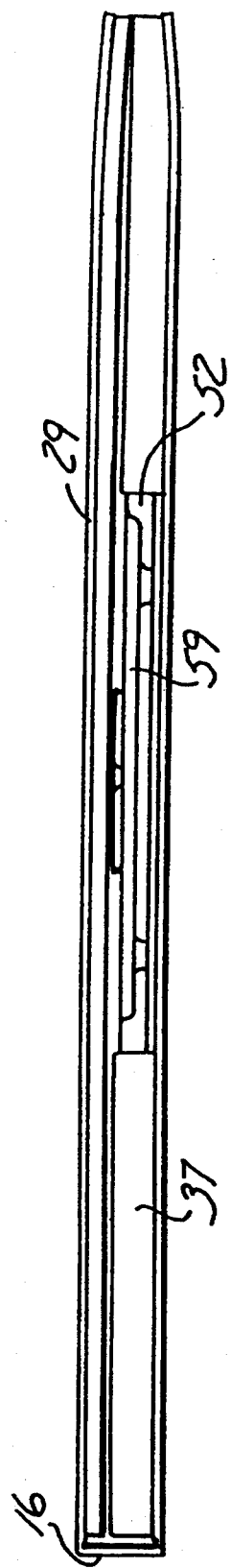

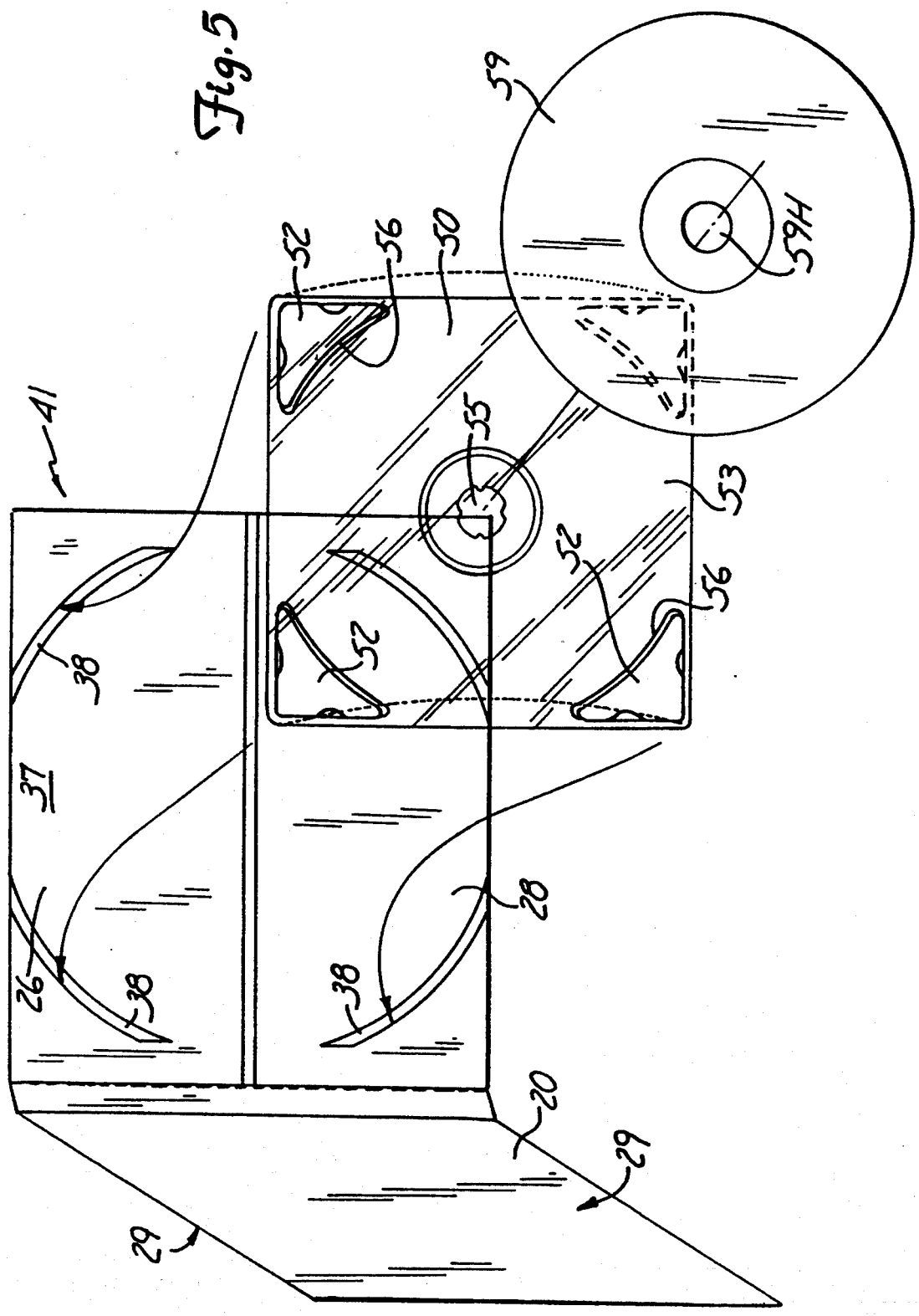

COMPACT DISC PACKAGE WITH BI-FOLD PANELS

CROSS REFERENCE TO RELATED APPLICATION

Reference is made to copending United States patent application Ser. No. 08/152467 filed Nov. 12, 1993 entitled DUAL DISC ADAPTER, and Application Ser. No. 08/201,668 filed on even date herewith entitled COMPACT DISC PACKAGE, both assigned to the Assignee of this application.

BACKGROUND OF THE INVENTION

The present invention relates to a recyclable paper board package which has a split base panel and is made of recyclable materials that encloses, supports, and protects the compact disc.

Compact discs are used for a wide variety of different applications, including storing digitally recorded music, and for read only memory (ROM) devices for computers. Traditionally the discs are packaged in an all plastic boxes known as a "jewel boxes", which are fragile and not easily shipped, and are rather hard to recycle.

A recent development for packaging is a flexible clear plastic insert that holds a compact disc supported on a center hub and at the disc. The insert mounts in a recyclable paper board package in the present invention.

Compact discs have been packaged in paper board jackets, but generally the jackets form a sleeve or chamber which has one open edge through which a compact disc can be slid into the interior chamber. Paper board jackets have the advantages of being recyclable, inexpensive, light weight, and easily mailable, as well as being easily printed.

A paper board compact disc jacket is shown in U.S. Pat. No. 5,248,032. A compact disc holder and a jacket for the disc holder are shown in U.S. Pat. No. 5,205,405. A substantial number of panels are used for forming the jacket.

SUMMARY OF THE INVENTION

The compact disc package of the present invention is made of paper board panels and receives and holds a compact disc, preferably, as shown, on a separable flexible plastic insert or holder. The insert or holder is retained in the package by pockets formed in the corners of a base panel assembly which has inner and outer base panels, and wherein the inner base panel is split and folds over the outer panel and is glued in center portions. The split inner base panel has slots leading to the pockets to receive the corners of the flexible insert and retain the insert in position. The use of a split inner base panel obviates the need for gluing flaps on the base panel assembly.

A compact disc can be placed onto the insert held on the base panel assembly, and a cover panel assembly folded over the base panel assembly, the insert and a compact disc held on the insert. The package has double panels of paper board on both sides of the disc to provide adequate rigidity for protection, and also for simplicity of printing. The cover can be opened in the manner of a book to provide access to the compact disc support held on the base panel assembly for ease of insertion and removal.

The double panels of the cover form large pockets which will retain informational booklets and brochures easily by slipping one cover of the booklet into the slot. If desired, booklets can be glued to the inside of the package cover.

The paper board jacket is made of materials that can be recycled, and the plastic insert is separable from the package so recycling is simplified. The package can be made at relatively low cost and used with a wide range of compact discs. Further, the cover and base panel assemblies are formed of folded panels that are held together easily and reliably.

The package is generally shrink wrapped for handling and is easily mailed.

BRIEF DESCRIPTION OF THE DRAWINGS

FIG. 1 is a flat layout of the compact disc package made according to the present invention;

FIG. 2 is a top plan view of a formed base panel assembly and cover panel assembly with a flexible compact disc insert shown in position on the base panel assembly;

FIG. 3 is a view taken along line 3—3 in FIG. 2;

FIG. 4 is a side elevational view of the cover panel shown in position overlying a compact disc and the insert on the base panel assembly; and FIG. 5 is an exploded perspective view of a compact disc package made according to the present invention shown in a partially opened position and illustrating an insert.

DETAILED DESCRIPTION OF THE PREFERRED EMBODIMENTS

A flat layout or blank 10 of paper board after it has been die cut for the package of the present invention is illustrated. The flat blank 10 is made up of a plurality of single thickness panels and flaps joined by lines that are scored for ease of folding. It is to be understood that the term fold line means a line has been scored so that the two panels joined at the fold line can be folded relative to each other. The compact disc package blank includes a cover section indicated generally at 12 and a base section indicated generally at 14. The cover section 12 and the base section 14 are joined together with an edge panel 16. The cover section 12 includes a pair of assembly flaps 17 and 18, an inner cover panel 20, and an outer cover panel 22. The flap 17 is joined to the outer panel 22 along a scored fold line 15 and flap 18 is joined to a second edge of the outer cover panel 22 along a scored fold line 19, and the inner and outer cover panels are joined together along a scored fold line 21. The outer cover panel 22 is joined to one side of the edge panel 16 along a scored fold line 23.

The base section 14 includes a first inner base panel section 26 and a second inner base panel section 28. First inner base panel section 26 joins an outer base panel 30 along a scored fold line 27. Outer base panel 30 is joined to the second inner base panel section 28 along a scored fold line 31. One edge of the outer base panel 30 is joined to an edge of the edge panel 16 along a scored fold line 35.

The inner base panel sections 26 and 28 as shown in FIG. 1, are each provided with two part circular slots 38 adjacent the corners at the fold lines 27 and 31, as shown. The part circular slots 38 are formed by removing portions of the paper board stock to leave pocket forming sections 40 in the corners. The pocket forming sections 40 do not have to be at corners, but as will be seen, the corner areas are convenient with a rectilinear periphery.

To form the compact disc package from blank 10, the flaps 17 and 18 are folded over onto the inside of the outer cover panel 20 along the fold lines 15 and 19, and then the inner cover panel 20 is folded along fold line 21 to overlie the outer cover panel 22. The flaps 17 and 18 are under an edge of the inner cover panel 22 generally shown by the dotted lines in FIG. 2. The flap 18 is then glued to the overlying surface of the inner cover panel 20 to form a double layer cover panel assembly 29. (See FIGS. 2 and 5.) The flap 17 may be omitted and the edge portions of the inner and outer cover panels may be left unattached or the edges may be glued together.

The blank 10 is then further formed by folding the inner base panel section 26 along the scored fold line 27 to overlie about one half of the inner surface of the outer base panel 30, and the inner base panel section 28 is folded along scored fold line 31 to overlie the other one half of the outer base panel 30. The free edges of the inner base panel sections 26 and 28 can overlap slightly, if desired. The surfaces of the inner base panel sections 26 and 28 facing the outer base panel 30 and adjacent the free edges of the base panel section are then glued against the inner surface of the outer base panel 30 to form a base panel assembly 37 as shown in FIGS. 2, 3, and 5. The outer edge portions of the inner base panel sections 26 and 28 adjacent the fold lines 27 and 31 are not glued to the inner surface of the outer base panel 30. The gluing in the center of the outer base panel will hold the two inner panel sections securely to the outer base panel 30. After folding and gluing the two inner base panel sections 26 and 28, the two sections form an inner base panel 33, as shown in FIGS. 2 and 5. After folding, the under surface of inner cover panel 20 and inner base panel 33 of the blank 10 of FIG. 1 are facing upwardly in FIG. 2. The cover panel assembly also has two overlying panels forming the cover panel assembly.

Referring to FIG. 2, where the individual panels are folded to form the base panel assembly 37 and cover panel assembly 29 the inner base and cover panels are shown with the compact disc package 41 open. It can be seen in FIGS. 2 and 3 that the part circular slots 38 open to pockets or recessed chambers 43 under pocket forming sections 40 of the inner base panel 33 even when center portions of the inner base panel 33 are secured to the inner surface of the outer base panel 30. The pocket forming sections 40 form the pockets 43 between the inner base panel 33 and the outer base panel 30.

Referring to FIGS. 2 and 5 in particular, a compact disc holding insert 50 as shown is made generally with a rectangular periphery slightly smaller than the base panel assembly, and has corner bosses 52 that are raised up out of the general plane of a main flat insert panel 53. The bosses 52 will fit through the slots 38 and into the pockets 43 formed under the pocket forming sections 40 between the inner base panel 33, comprising inner base panel sections 26 and 28, and the outer base panel 30 in the corner regions. The raised corner bosses 52 at the four corners of the insert 50 have inner part circular surfaces shaped to define a central region for receiving a compact disc 59 (FIG. 5). Additionally, the flat insert panel 53 has a central raised retainer hub portion 55 that is surrounded by a lower level annular boss or flange 57 that is spaced outwardly from the hub 55 to contact the compact disc in the desired location.

Each of the raised corner bosses 52 is provided with a part annular land 54 that is formed at the interior edge of each corner boss 52. The lands 54 are raised slightly above the insert panel 53 and have substantially the same height as the surface of the annular boss or flange 57. The corner bosses 52 are also spaced inwardly slightly from the adjacent peripheral edges of the insert panel 53.

As can be seen in FIG. 2, a part cylindrical retaining shoulder surface 56 is formed on each corner boss 52. The radius of the part cylindrical surface on each corner boss 52 is slightly larger than the radius of the compact disc 59 (FIG. 5) which is to be received by the insert 50.

The outer peripheral surface of retainer hub 55 forms an interference fit with a normal bore opening 59A in compact disc 59. Inwardly directed recesses on the top of retainer hub 55 are provided to permit the periphery of the retainer hub 55 to compress slightly when a compact disc 59 is pressed onto the retainer hub 55 so that there are gripping and retaining forces holding the compact disc 59 in place.

The material for the insert 50 is preferably a clear moldable polymer such as PETG or a polystyrene, and thus in FIG. 2 the edges of slots 38 can be seen.

The insert adapter 50 is quite flexible plastic, so that it can be bowed around a center line (see the bowed dotted lines by the insert 50 in FIG. 5) and two of the bosses 52 slid into the respective pockets 43 through slots 38 on one side of the base panel assembly 37, and the other two of the bosses 52 are slid into the other two pockets 43 through the respective slots 38 so that the insert 50 is positively retained within the compact disc package. The arrows in FIG. 5 illustrate this action.

The corner bosses 52 are projecting portions of the insert 50 in that they protrude out from a central axis of hub 55 more than the minimum cross dimension of the insert 50.

Once the insert 50 is placed into the compact disc package 41, the compact disc 59 is merely slipped onto the hub 55 and supported on the boss 57 and lands 54 and then the cover panel assembly 29, formed from the flat blank cover section 12, is folded along the fold lines 23 and 35 to overlie the compact disc as shown in FIG. 4. Note that the inner edge of the cover panel assembly 29 is inset from fold line 23 for accommodating the thickness of the cover panel assembly 29 when the compact disc package 41 is closed as shown in FIG. 4. The cover panel assembly 29 then overlies the compact disc. The closed package 41 then may be shrink wrapped for shipment. A tab may be placed across the edges that form the open edge of the closed package, opposite from edge panel 16 to hold the package closed, if desired.

It can be seen in FIGS. 2, 3, and 5 that the flat wall 53 comprises the center portion of the insert 50 and the bosses 52 are raised from this wall but still pass through the slots 38 and fit underneath the pocket forming sections 40 that form the pockets or recesses 43 .after the two inner base panel sections have been folded over on top of the outer base panel 30, and the inner surface of outer base panel 30. The inner and outer cover panels 20 and 22 of cover panel assembly 29 may be left unglued except for the flaps 17 and 18 and the inner and outer cover panels can be moved apart to form a large pocket into which a cover of a booklet or brochure can be inserted from and opening to the pocket on the side or edge indicated at 20A in FIG. 2 adjacent the edge panel 16. An instruction book, advertising or the like can be secured on the cover panel assembly in this manner.

The booklet would then rest above the compact disc in the package when the cover panel assembly is closed. This pocket between cover flaps 20 and 22 can be used to hold a second compact disc also. The entire exposed surfaces of the flaps 17 and 18 can be used for gluing the inner and outer cover panels together. The surfaces of the flaps 17 and 18 are glued to the inner surface of the inner cover panel 20.

Thus, by selecting the appropriate paper stock as is well known in the trade, a suitable paper board package for a compact disc can be used, in combination with a separate insert of light, flexible plastic that retains the compact disc in position on the insert. The insert is held securely by having the corner portions of the insert fit into pockets 43. The raised bosses 52 of the insert 50 help hold the assembly of the compact disc 59, insert 50, and the base panel assembly 37 of the compact disc package in proper orientation. Folding over the cover panel assembly 37 closes the compact disc package 41.

The slots 38 and pockets 43 can be placed in various locations, and generally at least two slots 38 and pockets 43 are used. The pockets can be formed at any desired location around the insert, and the insert can have different peripheral configurations. For example, the insert could be circular with tabs protruding for insertion into retaining pockets on the compact disc package. The compact disc package 41 can be made with retainers for the insert 50 on both the cover panel assembly and the base panel assembly so a double disc package can be formed. The edge panel 16 could be made wider for a double disc package, or made wider to accommodate a booklet that was very thick above the compact disc.

The package shape and size and the retainer for the insert are easily customized to fit the requirements of the user. The compact disc package is cost effective and is recyclable. The plastic insert is separable for disposal. Water based adhesive is preferable, and when printed with vegetable based inks and varnishes, the package is 100% recyclable. The package is compact, flexible as to design and has a low mailing cost, as compare to available compact disc packages.

Messages, instructions and art work can easily be printed on one surface of the flat blank layout shown in FIG. 1. Then when the cover and base panels are folded to position shown in FIG. 2, and as seen in FIG. 5, four printed panels are exposed when printing only the primary surface. The four panel display is accomplished by printing only one surface of the flat blank. The inner surface of the base panel assembly 37 underneath the insert 50 can carry printed messages or art work because the insert 50 is made of a clear plastic so that legends, symbols or writing can be read through the insert 50.

It should also be noted that the large pocket in the cover panel assembly is of sufficient size to hold a second compact disc and the pockets on either the base or cover panel assemblies can be made large enough to hold a compact disc directly, without the insert. A longer access slot to the pockets would be used, and such slot or slit could be made diagonally across the inner cover or base panels. The compact disc can protrude partially out of the pocket and still be retained in such an arrangement.

Although the present invention has been described with reference to preferred embodiments, workers skilled in the art will recognize that changes may be made in form and detail without departing from the spirit and scope of the invention.

What is claimed is:

1. A compact disc package comprising:
  (a) a base panel assembly, said base panel assembly having:
    (i) a substantially rectangular outer base panel having four edges; and
    (ii) two inner base panel sections joined to the outer base panel along first and second opposite edges of the outer base panel such that each inner base panel section is foldable to extend over the outer base panel, wherein each of said inner base panel sections has two slots formed therein such that said slots provide access to corresponding pockets which are formed in the corners of the inner base panel sections adjacent the outer base panel when each inner base panel section is folded over the outer base panel;
  (b) an insert for retaining a compact disc, said insert being retained on the base panel assembly by said pockets; and
  (c) a cover panel assembly joined to the outer base panel along a third edge thereof such that the cover panel assembly can be folded over the base panel assembly and the insert.

2. The compact disc package of claim 1 wherein said base panel assembly and said cover panel assembly comprise paper board stock, and said base panel assembly and cover panel assembly are formed from a unitary paper board blank.

3. The compact disc package of claim 1, wherein the inner base panel sections each are of a size to overlie substantially one-half of the outer base panel when folded.

4. The compact disc package of claim 3, the inner base panel sections having free edges opposite the said first and second edges of the outer base panel, the portions of the inner base panel sections adjacent the free edges being adhesively secured to the outer base panel when folded to overlie the outer base panel.

5. The compact disc package of claim 1, wherein the insert is substantially rectilinear and has four corner portions forming four projecting portions received in the pockets.

6. A compact disc package for use with an insert for holding a compact disc, the package comprising:
  (a) a base panel assembly, said base panel assembly having:
    (i) a substantially rectangular outer base panel having four edges; and
    (ii) two inner base panel sections joined to the outer base panel along first and second opposite edges of the outer base panel such that each inner base panel section is foldable to extend over the outer base panel, wherein each of said inner base panel sections has two slots formed therein such that said slots provide access to corresponding pockets which are formed in the corners of the inner base panel sections adjacent the outer base panel when each inner base panel section is folded over the outer base panel; and
  (b) a cover panel assembly joined to the outer base panel along a third edge thereof such that the cover panel assembly can be folded over the base panel assembly.

7. The compact disc package of claim 6 wherein said base panel assembly and said cover panel assembly comprise paper board stock, and said base panel assembly and cover panel assembly are formed from a unitary paper board blank and the cover panels and outer base panel being of substantially the same size.

8. The compact disc package of claim 6, wherein the inner base panel sections each are of size to overlie substantially one-half of the outer base panel when folded.

9. The compact disc package of claim 8, the cover panels comprising an inner cover panel and an outer cover panel, the outer cover panel having flaps formed along two sides thereof which are foldable over the outer cover panel to provide glue surfaces for gluing the inner cover panel over the outer cover panel to form a pocket open adjacent the edge of the cover panel assembly joined to the base panel assembly.

* * * * *

UNITED STATES PATENT AND TRADEMARK OFFICE
CERTIFICATE OF CORRECTION

PATENT NO.: 5,419,433

DATED: May 30, 1995

INVENTOR(S): Harrer et al.

It is certified that error appears in the above-identified patent and that said Letters Patent is hereby corrected as shown below:

Col. 1, lines 22/23, "in an all plastic boxes known as a "jewel boxes"," should be --in an all plastic box known as a "jewel box",--.

Col. 4, line 57, "43 .after" should be --43 after--.

Col. 4, line 65, "and opening" should be --an opening--.

Col. 5, line 40, "compare" should be --compared--.

Col. 6, line 14, "comers" should be --corners--.

Col. 6, line 41, "comer" should be --corner--.

Col. 6, line 57, "comers" should be --corners--.

Signed and Sealed this

Twenty-sixth Day of December, 1995

Attest:

BRUCE LEHMAN

*Attesting Officer*  *Commissioner of Patents and Trademarks*